US005551733A

United States Patent [19]
Henwood

[11] Patent Number: 5,551,733
[45] Date of Patent: Sep. 3, 1996

[54] PLASTIC PIPE BRANCH FITTING WITH REINFORCING RIBS

[75] Inventor: James V. Henwood, Mona Vale, Australia

[73] Assignee: Vindex Tubemakers Pty. Limited, Australia

[21] Appl. No.: 373,240

[22] PCT Filed: Jul. 13, 1993

[86] PCT No.: PCT/AU93/00344

§ 371 Date: Jan. 12, 1995

§ 102(e) Date: Jan. 12, 1995

[87] PCT Pub. No.: WO94/07712

PCT Pub. Date: Jan. 20, 1994

[30] Foreign Application Priority Data

Jul. 13, 1992 [AU] Australia ................... PL3495

[51] Int. Cl.$^6$ ................................. F16L 41/02
[52] U.S. Cl. .............. 285/155; 285/286; 285/156; 138/172
[58] Field of Search ............... 285/156, 286, 285/155; 138/172, 106

[56] References Cited

U.S. PATENT DOCUMENTS

| 1,755,898 | 4/1930 | Root | 285/156 |
| 3,279,500 | 10/1966 | Feder | 138/172 |
| 3,497,245 | 2/1970 | Metzger | 285/286 |
| 4,971,307 | 11/1990 | Killerud et al. | 285/155 |

FOREIGN PATENT DOCUMENTS

| 36955 | 6/1973 | Australia . | |
| 482277 | 4/1992 | European Pat. Off. . | |
| 610653 | 3/1935 | Germany | 285/156 |
| 668606 | 12/1938 | Germany | 285/156 |
| 411268 | 3/1947 | Italy | 285/155 |
| 2189002 | 10/1987 | United Kingdom | 138/172 |

*Primary Examiner*—Dave W. Arola
*Assistant Examiner*—Heather Chun Shackelford
*Attorney, Agent, or Firm*—David P. Gordon

[57] ABSTRACT

A branched pipe fitting, such as a pipe tee, of plastics material has structure for preferential stiffening the side regions of the fitting. In one embodiment, the stiffening structure may include ribs crossing at the side apex point of the tee but not extending across the crutch points.

18 Claims, 6 Drawing Sheets

PLASTIC PIPE BRANCH FITTING WITH REINFORCING RIBS

BACKGROUND OF INVENTION

The present invention relates to plastics material pipe tees. The invention is particularly suited for application to pipe tees for joining pipes of 80 mm diameter or more, and particularly for use in pressure pipe installations.

Plastics material pipes and fittings have widespread application, but are not widely used for applications in which they are subjected to relatively high pressures. A major reason for this is the short life of plastics pipe tees when subjected to cyclic variations in pressure such as those which occur in a pipeline when a valve is opened or closed or which occur in the region downstream of a pump. In these situations, plastic pipe tees have a tendency to develop cracks at the crutch points which lie at the junction of the branch and the straight body of the tee in the centre plane which contains the axes of both the branch and the body. This problem is peculiar to plastics tees and does not affect cast iron tees, and thus cast iron tees are often preferred for these situations.

Attempts have been made to overcome this defect by stiffening the tee at the crutch points by thickening at those points or by the provision of ramps moulded with the tee to extend between the body and the branch in the region of the crutch. However, these modifications have been found to give no significant increase to the life of the tee. Furthermore, thickening in the region of the crutch promotes unequal heat transfer during the cooling process after moulding, resulting in cooling stresses which weaken the tee.

SUMMARY OF THE INVENTION

The present invention seeks to reduce the tendency of plastics tees and other branched fittings to crack at the crutch.

Surprisingly, the applicant has discovered that this may be achieved by stiffening the tee in the side region of the intersection between the surfaces of the branch and body, rather than at the crutch point as has previously been proposed. As used herein, crutch point and crutch points refer to the region as understood in the art.

The present invention thus provides a branched pipe fitting of plastics material, characterised in the provision of preferential stiffening means for preferentially stiffening the side regions of the fitting.

Preferably, the preferential stiffening means comprises localised thickening in the side region compared to the crutch points. In one preferred embodiment, the thickening comprises ribs each of which extends substantially along a locus defined by the intersection of the outer surface of the fitting and a plane which:

(a) passes through a crutch point, (b) is perpendicular to the plane containing the axes of both the branch and the body of the fitting and (c) is convergent with the axis of the branch in the direction away from said branch.

In one particularly preferred form, the thickening comprises one pair of ribs on each side of the tee, essentially following the lines of intersection of the surfaces of the body and the branch, with each pair crossing essentially at the apex point of the respective side.

In a further preferred form of the invention, the side apex points are preferentially stiffened compared to the crutch points. Preferably, there is no thickening of the pipe tee at the crutch points.

BRIEF DESCRIPTION OF THE DRAWINGS

Further preferred embodiments of the present invention shall now be described with reference to the accompanying drawings.

DETAILED DESCRIPTION OF THE PREFERRED EMBODIMENTS

Figure 1:
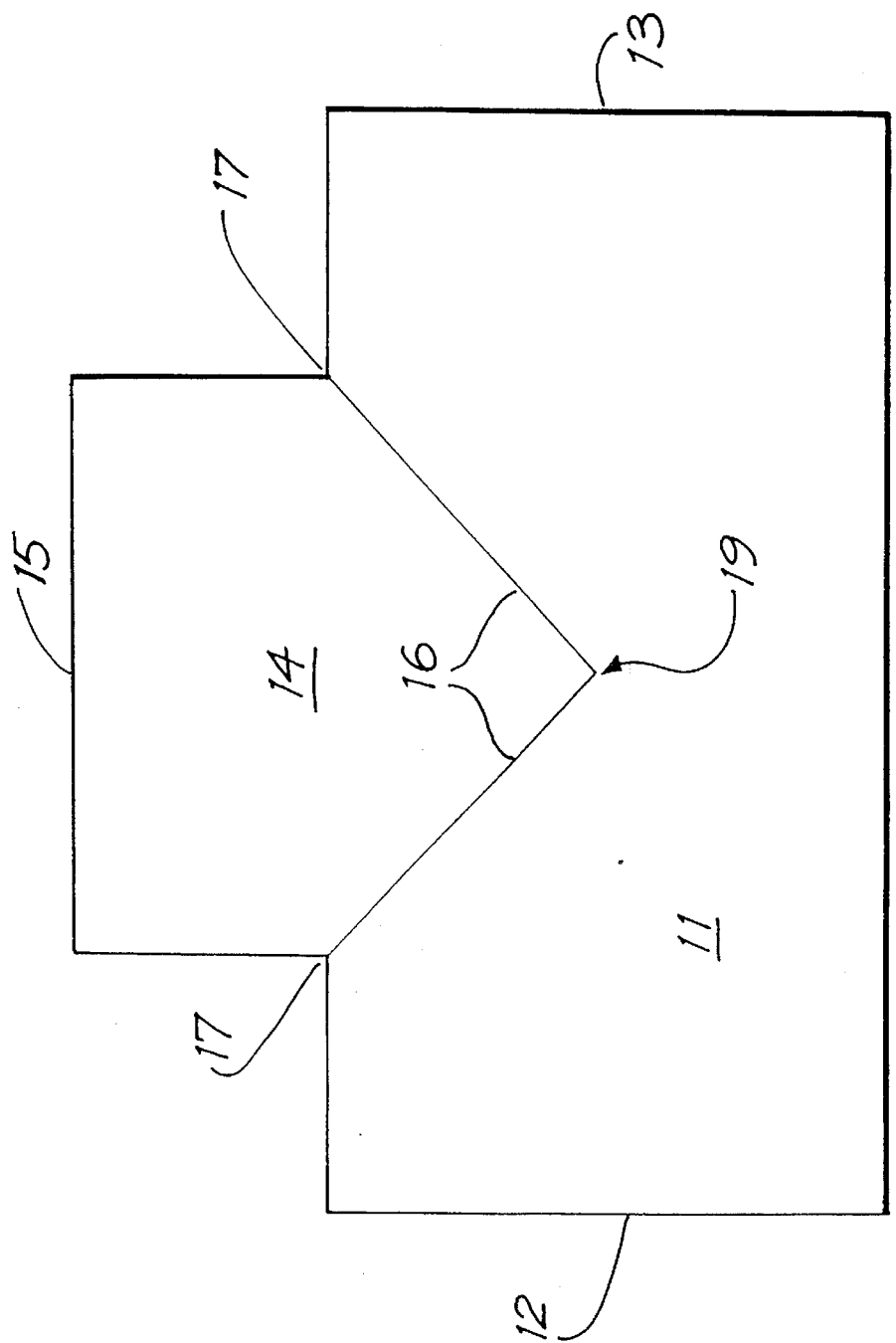
FIG. 1 is a side view of a standard plastics pipe tee.

With reference to FIG. 1, a standard pipe tee comprises a straight body 11 with oppositely extending sockets 12, 13 and a branch portion 14 with socket 15. The tee has substantially uniform wall thickness. The intersection 16 between the body and the branch is seen as a V-shape in side view, the bottom point of that V being the side apex point. As discussed above, these prior art plastics pipe tees have had problems with cracking at the crutch points 17 at the top of this V when subjected to cyclic pressure variation.

FIGS. 2 to 6 illustrate a preferred pipe tee according to the invention. The pipe tee is identical to that of FIG. 1, except for the addition of ribs 18 which are integrally moulded with the tee. These ribs follow the intersection lines 16 of the body and the branch and are projected further along these lines to form an X having its centre at the apex point 19 of the side. The height of the ribs varies such that the maximum height is at the apex points and the ends of the X merge into the surface of the tee. The ribs do not extend across the crutch points of the tee.

Pipe tees according to the invention offer a substantial increase in life over standard tees. It is believed that the invention is particularly advantageous for substantially rigid pipe tees with relatively thick section, for example with a socket thickness over about 5% of the pipe diameter.

Preliminary cyclic pressure tests show that a tee according to FIGS. 2 to 5, in which the ribs have a width about equal to the thickness of the socket and a depth of about twice the socket thickness, has a life of about 3 times that of an otherwise identical pipe tee without the ribs.

The Applicant believes the invention works by reducing tensile stresses at the inside of the crutch point. A full, three-dimensional analysis of the forces at this point is complex. However, the Applicant believes that the following two-dimensional analysis is useful in determining the mechanism by which the invention works.

In a uniform round pipe subjected to internal pressure, the stresses developed in the wall are pure tensile stresses in the circumferential direction, without bending. However, any shape cross-section other than circular produces additional bending stresses.

Considering a pipe tee, it can be seen that, at the point of attachment, the main pipe no longer has a complete circular cross-section. The Applicant believes that, as the tensile stresses can only be supported by continuous hoops of material, the tee relies on hoops of material in other planes to develop its resistance to internal pressure.

Figure 2:
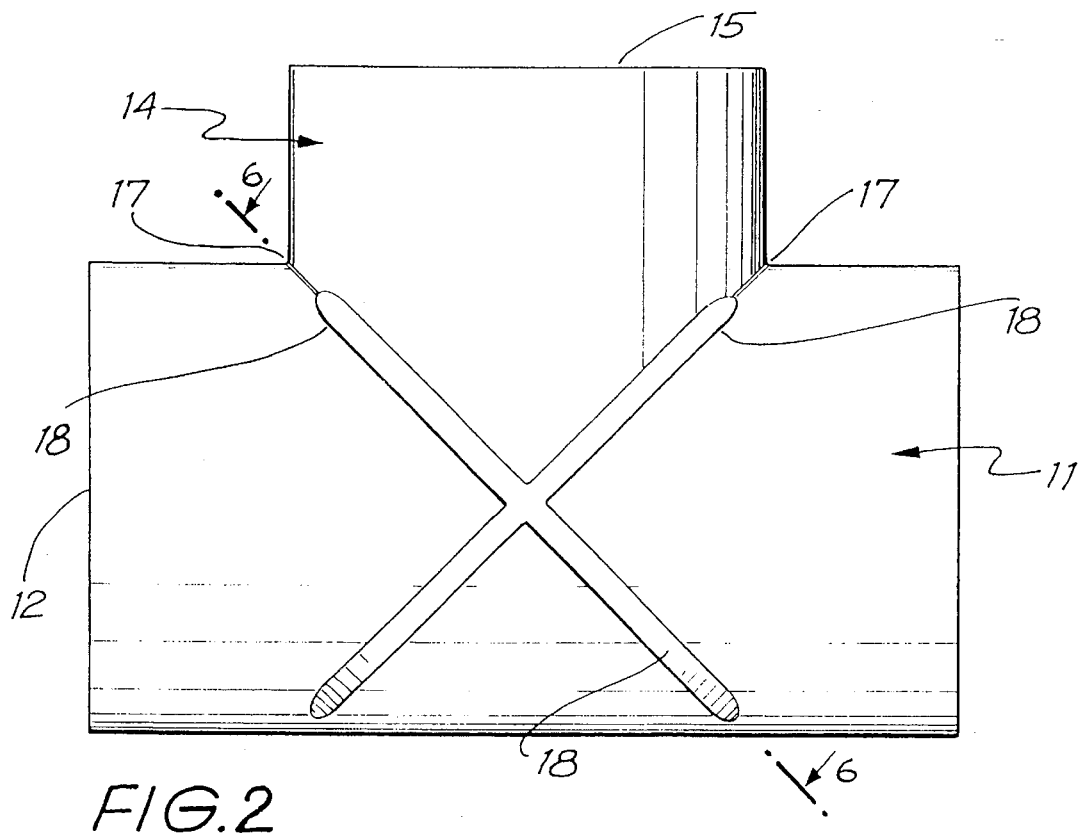
FIG. 2 is a side view of a first pipe tee according to the present invention.
Figure 3:
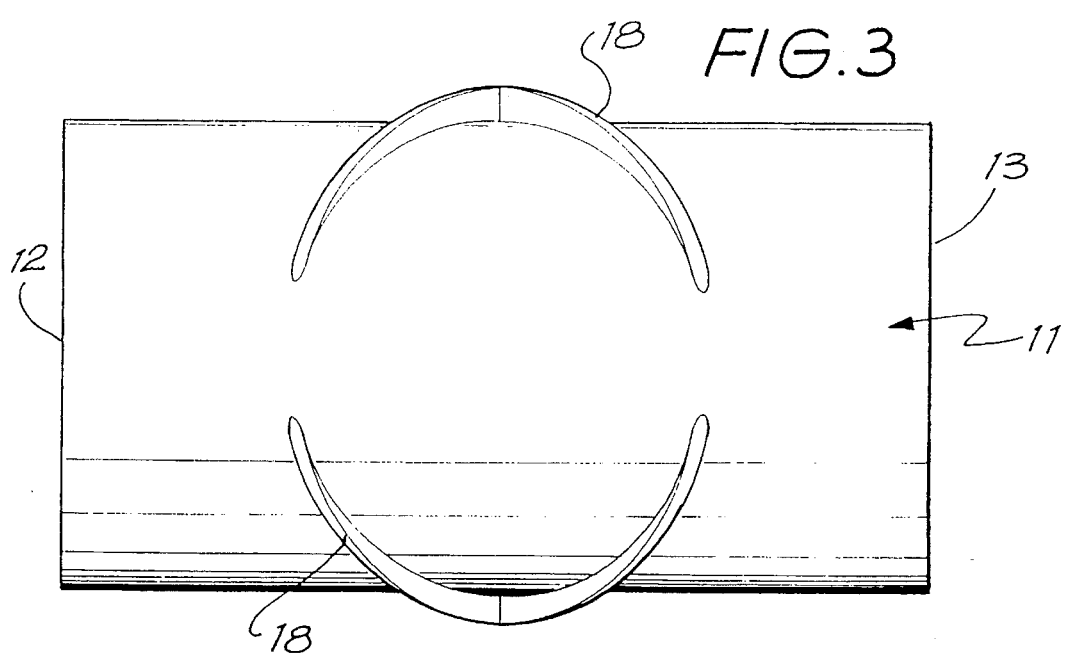
FIGS. 3 to 5 are inverted plan, perspective and plan views of the pipe tee of FIG. 2.
Figure 4:
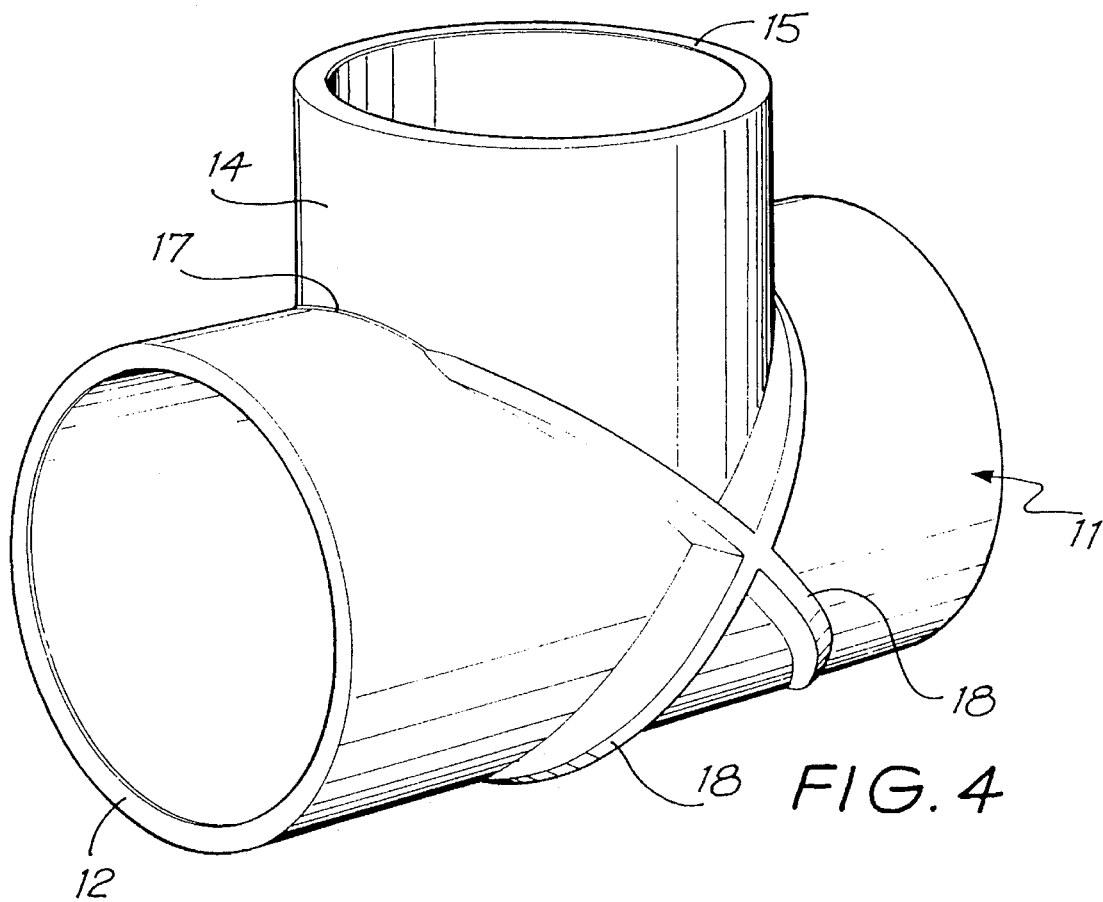
Figure 5:
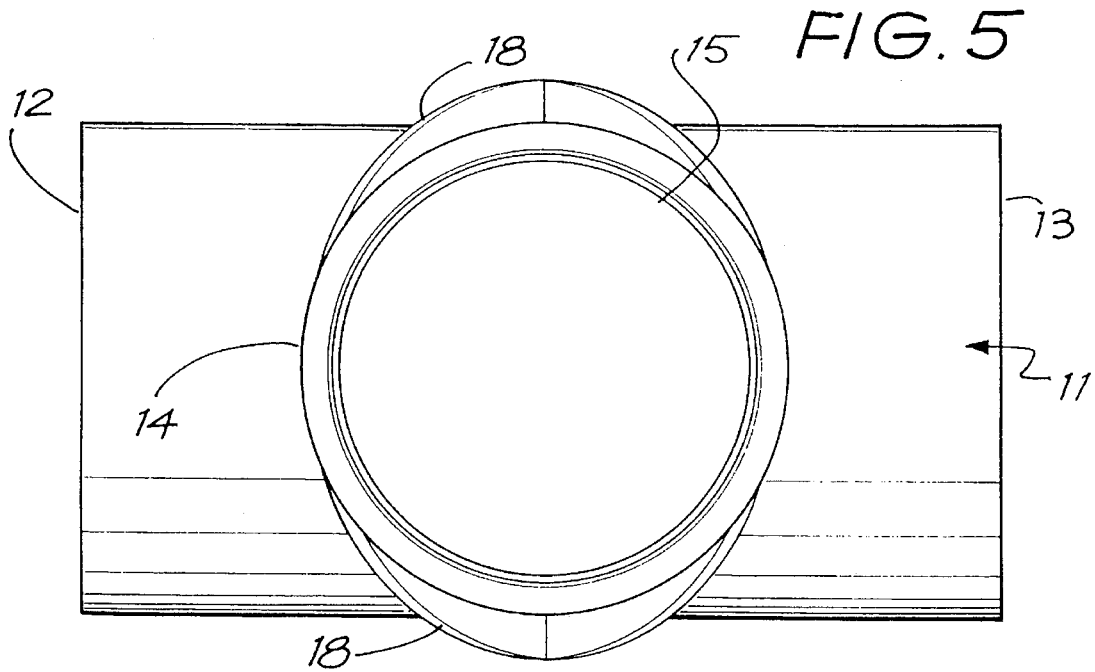
Figure 6:
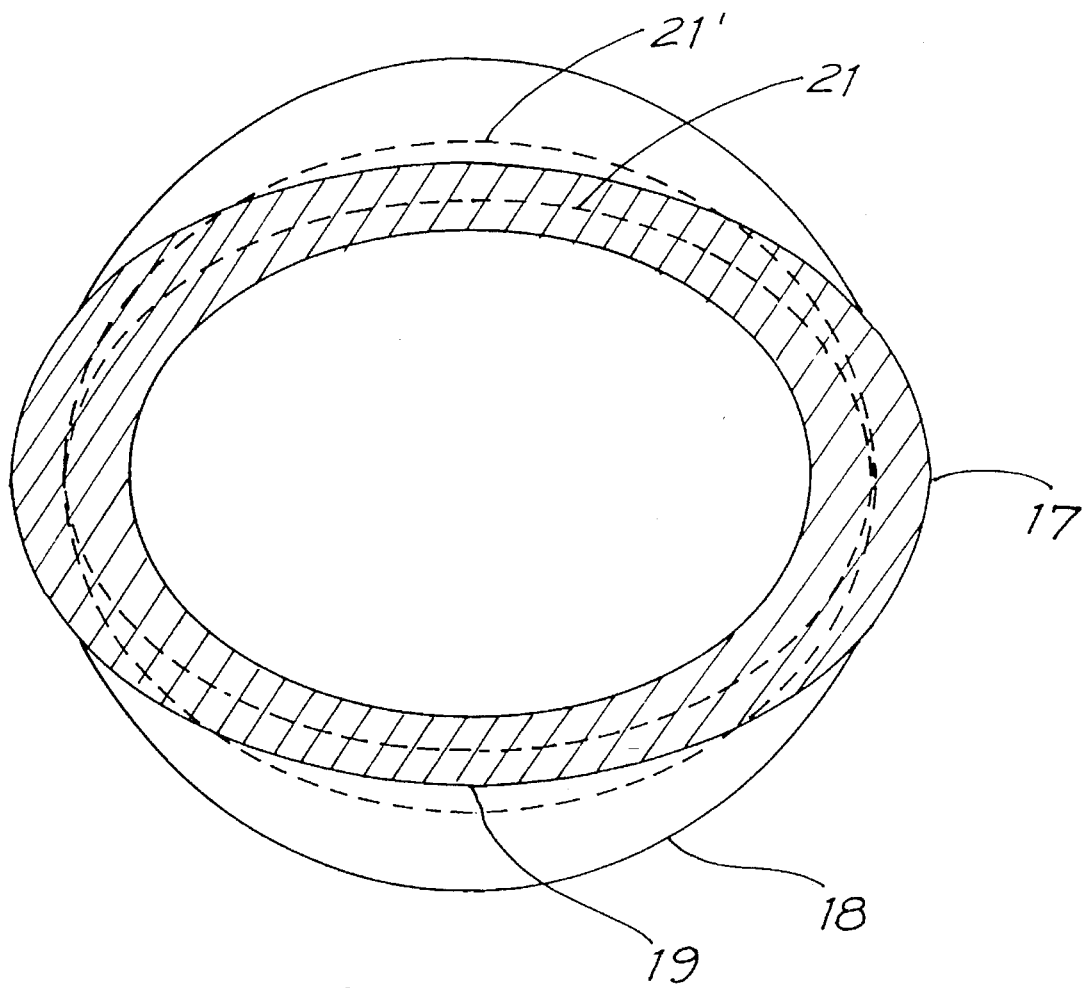
FIG. 6 is an approximate cross-section along line 6—6 of FIG. 2.

FIG. 6 illustrates the hoop of material of the pipe tee of FIGS. 2 and 3 in the plane 45° to the longitudinal axis of the body. As can be seen, the hoop is an elliptical section. The hoop resists internal pressure by becoming more circular, resulting in bending stresses which reach a maximum at the points on the major and minor axes of the ellipse, but in opposite directions. At the minor axes, corresponding to the side apex points 19 of the tee, the inner surface is in compression and the other surface in tension. At the major axes, one of which corresponds to the crutch point 17, the outer surface is in compression and the inner surface in tension. The Applicant believes that the tensile force on the inside of the crutch point due to bending, in addition to the normal tensile forces due to internal pressure, contributes to the tendency of prior art tees to fracture at that point.

The magnitude of the bending moments, and of the stresses thus created, depends on the ellipticity (or aspect ratio) of the ellipse—that is, the ratio of the major diameter to the minor diameter. The length of these diameters is measured to the neutral axis of the section, which is the point in the wall where the bending stresses are zero. For a section uniform in the longitudinal direction, the neutral axis is simply the centre line of the section.

By adding material to the outside of the side regions of the tee, the invention shifts the original neutral axis 21 of the section outwards in that region to a new neutral axis 21'. The neutral axis minor diameter increases, decreasing the aspect ratio of the elliptical section. The bending moments on the section are therefore reduced.

If material is added equally around the perimeter so that the proportional increase in wall thickness is constant, the aspect ratio of the ellipse is unchanged and the bending moments are not diminished. The addition of material to the outside of the crutch point only, as proposed in the prior art, in fact increases the aspect ratio and therefore the bending moments.

Similar considerations apply where the stiffening of the side regions is achieved by means other than ribs, such as by localised thickening or other reinforcing means.

Figure 7:
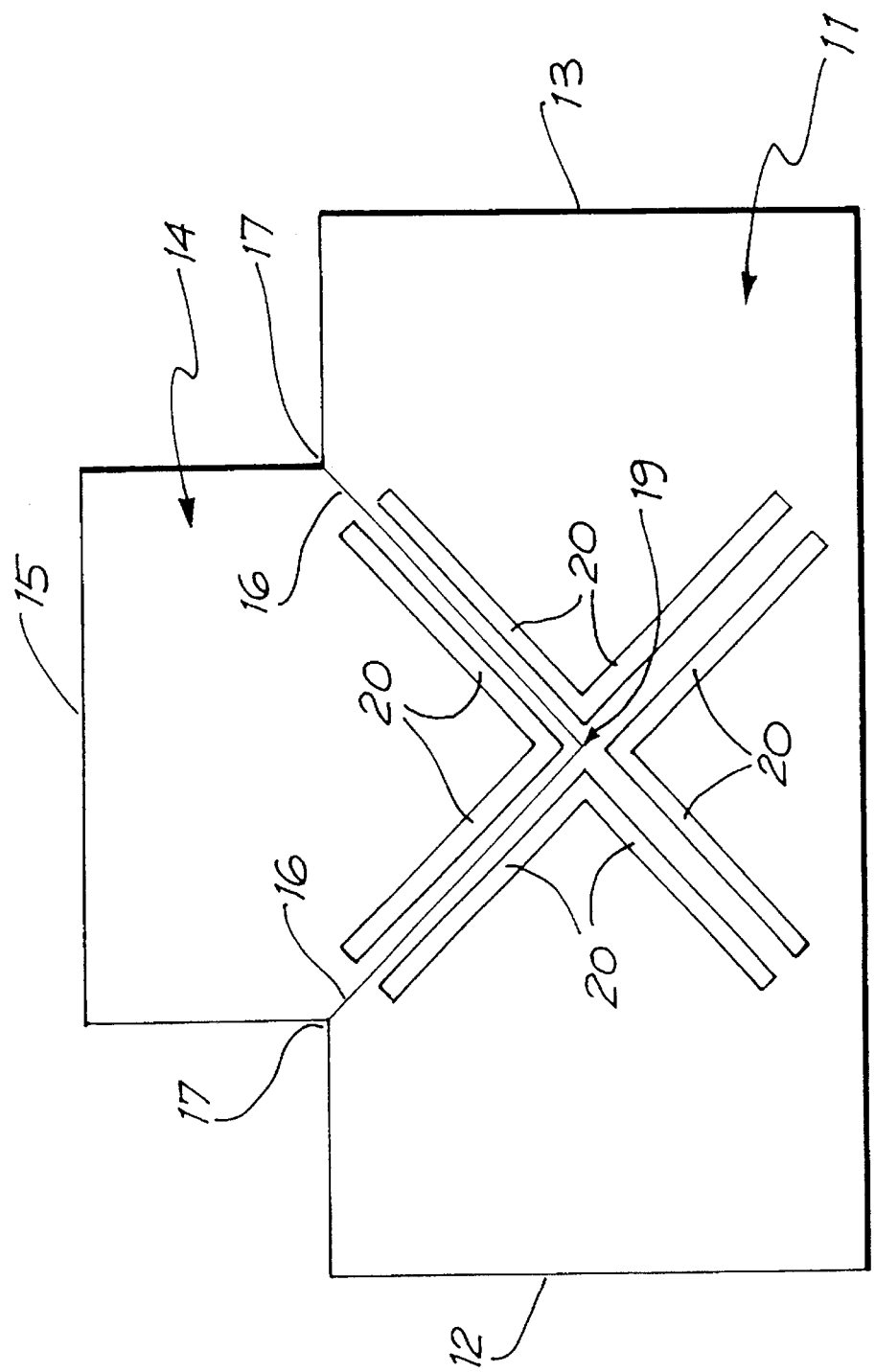
FIG. 7 and 8 are side views of second and third pipe tees according to the invention.

FIG. 7 shows an alternative, though less preferred, rib arrangement in which ribs 20 run each side of the intersection line 16. It is apparent that, although the ribs do not coincide exactly with the side apex point 19, they still serve to stiffen the side of the elliptical section as discussed above.

Figure 8:
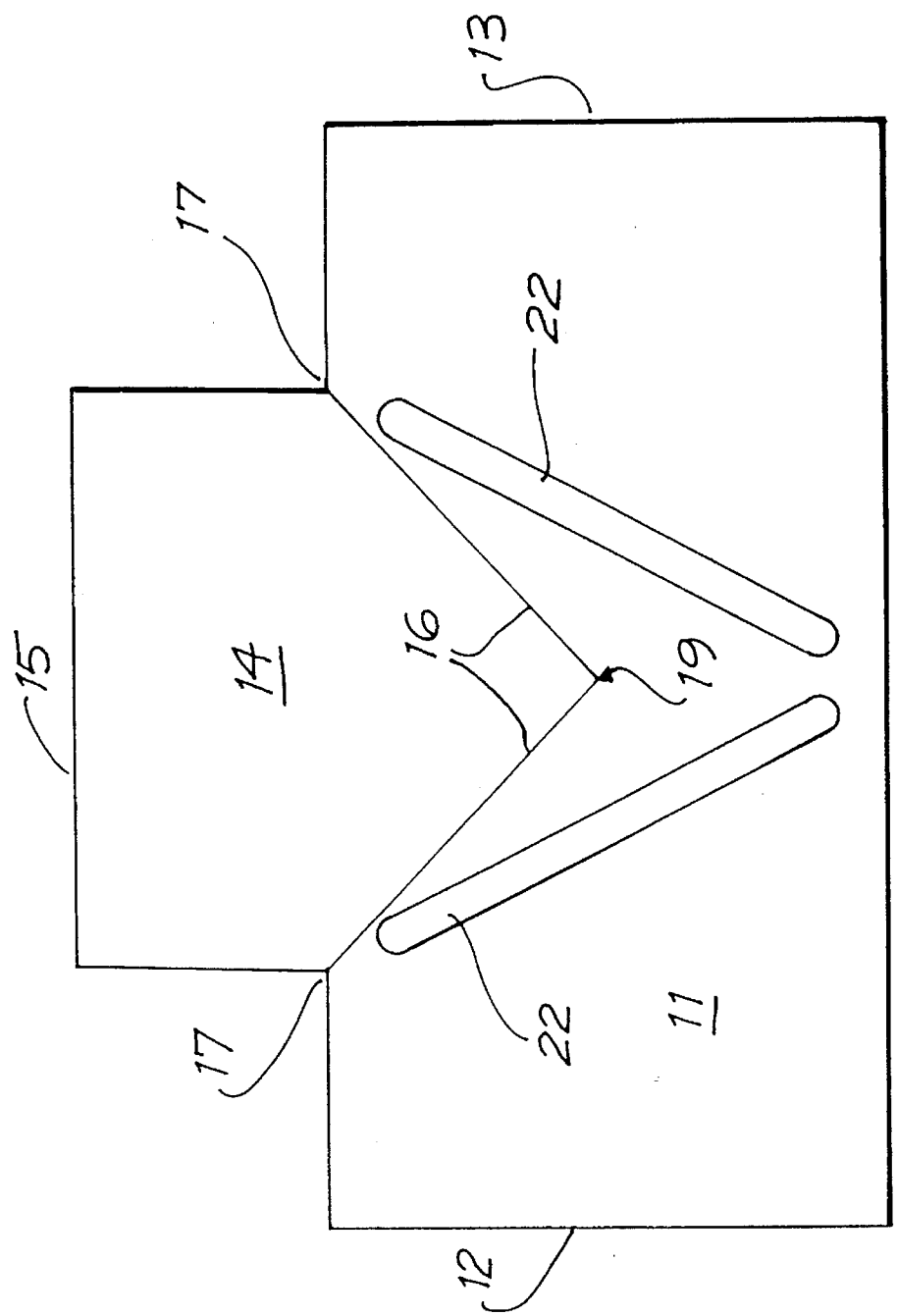

FIG. 8 shows an embodiment in which the ribs 22 are in the form of a V. These ribs serve to stiffen the sides of the tee in the planes in which they lie, and a similar analysis to that discussed in relation to FIG. 4 applies.

Although the invention is illustrated with reference to a 90°, equal diameter pipe tee, it will be appreciated that the present invention may be embodied in other specific forms without departing from the essential characteristics thereof, for example, in 45° or unequal pipe branches. The present embodiments and examples are therefore to be considered in all respects as illustrative and not restrictive, and all modifications which would be obvious to those skilled in the art are therefore intended to be embraced therein.

I claim:

1. A pipe tee comprising a body having a pair of oppositely directed end sockets disposed on a common axis, a branch having a socket with an axis normal to the axis of the body, a center plane containing the axes of the body and the branch, and a pair of crutch points at the intersection of the branch and body in said center plane wherein said pipe tee is of plastics material and stiffening means is provided at side regions of the tee effective to preferentially stiffen said side regions compared to the crutch points.

2. A pipe tee according to claim 1 wherein the stiffening means comprises thickening of the side regions compared to the crutch points.

3. A pipe tee according to claim 2 wherein the thickening comprises ribs moulded into the outer surface of the side region.

4. A pipe tee according to claim 1 wherein the tee intersects at least one plane which:

(a) passes through one of said crutch points, (b) is perpendicular to the center plane, and (c) is convergent with the axis of the branch in the direction away from said branch, wherein the stiffening means reduces the ovality of material of the tee in a cross-section in said plane.

5. A pipe tee according to claim 4 wherein said stiffening means comprises ribs extending substantially along a locus defined by the intersection of the outer surface of the tee and said plane.

6. A pipe tee fitting according to claim 5 wherein said ribs are on both sides of the tee.

7. A pipe tee according to claim 6 wherein each side of the tee has a pair of said ribs, each rib being in a said plane passing through a respective one of said crutch points.

8. A pipe tee according to claim 7 wherein each side of the tee has a respective side apex point, wherein said ribs on each side intersect each other substantially at the respective side apex point.

9. A pipe tee according to claim 8 wherein said ribs form an x-shape on each side of the tee.

10. A pipe tee according to claim 8 wherein the ribs have a maximum height at points on a plane which is perpendicular to the center plane and includes the axis of the body.

11. A pipe tee according to claim 10 wherein the height of said ribs tapers down either side of said point of maximum height.

12. A pipe tee according to claim 11 wherein the ribs do not extend in the region of the crutch points.

13. A pipe tee according to claim 3 wherein the ribs have a maximum height at points on a plane which is perpendicular to the center plane and includes the axis of the body.

14. A pipe tee according to claim 1 wherein said pipe fitting is a substantially rigid pressure pipe fitting of thick wall section.

15. A pipe tee according to claim 14 wherein said stiffening means comprises ribs moulded into the outer surface of the side region, said ribs being of a height about twice the wall thickness.

16. A pipe tee according to claim 1 wherein said stiffening means does not extend in the region of the crutch points.

17. A pipe tee according to claim 4 wherein said stiffening means does not extend in the region of the crutch points.

18. A branched pipe fitting, comprising a body having a pair of oppositely directed end sockets disposed on a common axis, a branch having a socket with an axis, a center plane containing the axes of the body and the branch, and a pair of crutch points at the intersection of the branch and body in said center plane, wherein said pipe fitting is of plastics material and stiffening means is provided at side regions of the fitting effective to preferentially stiffen said side regions compared to the crutch points, said stiffening means comprising a pair of ribs intersecting each other and molded into the outer surface of the side region and not extending in the region of the crutch points.

* * * * *